May 4, 1965 W. SCHÄFER 3,181,806
AUTOMATIC FASTENING DEVICE FOR FILM TAKE-UP REELS
Filed March 11, 1963 2 Sheets-Sheet 1

INVENTOR
WILHELM SCHÄFER
By Toulmin & Toulmin
Attorneys

INVENTOR
WILHELM SCHÄFER
By Toulmin & Toulmin
Attorneys

United States Patent Office 3,181,806
Patented May 4, 1965

3,181,806
AUTOMATIC FASTENING DEVICE FOR
FILM TAKE-UP REELS
Wilhelm Schäfer, Wetzlar (Lahn), Germany, assignor to
Ernst Leitz G.m.b.H., Wetzlar (Lahn), Germany
Filed Mar. 11, 1963, Ser. No. 264,317
Claims priority, application Germany, Sept. 1, 1962,
L 42,853
4 Claims. (Cl. 242—71.2)

The present invention relates to an automatic fastening device for attaching a film to the take-up reel, for example, in a movie camera without requiring manipulation of threading.

It is known to provide movie cameras with means guiding the film end automatically between the flanges of the take-up reel, wherein the core of this reel is provided with catch teeth or the like so that the film can engage the reel core. These guiding means are provided in many instances as guiding channels having a hook engaging the reel core slot for holding the reel during threading. After threading, the film is slightly dammed up thereby causing the hook to disengage from the reel core, and the take-up reel then can rotate and wind up the film. Such a structure has the disadvantage that the film continues to slide over the channel, or the channel has to be removed manually from the path of traverse of the film since such permanent sliding of the film over the channel has to be avoided.

Other structures have been made known, in which such a guiding channel is composed of two separated but adjacently positioned guiding plates, one above and one below the film, and there are means provided for spreading these plates apart after threading has been completed. This structure, however, is relatively complicated and functions properly only when the film is suitably stiff so that for threading the film end can overcome any resilient pressure urging the two plates against each other.

It is an object of the invention to provide a new and improved film threading device which is very simple, and placed out of the way during normal camera operation after threading has been completed.

According to one aspect of the present invention, in a preferred embodiment thereof, it is suggested to provide a spring biased, pivoted, single guide plate below the camera window inside of the camera casing. By means of a pin and spring arrangement, the guide plate is kept in a position between the flanges of a take-up reel while aiming towards the core thereof. The reel core is provided with fastening means for engaging the film end whenever the film is being guided along the guide plate towards the core of the take-up reel.

However, the guide plate can assume this position only when the cover of the camera casing is being removed. The casing is, in fact, always open when the film is being threaded. Since threading is the last step for reloading the camera, one then has just placed a new feed reel into the casing and is now desirous to have the film end connected with the take-up reel.

Upon placing the cover on the camera casing for closing it, a suitable edge, projection or the like at the cover engages the aforesaid guide plate or a projection therefrom for urging it, preferably pivoting it out of the space between the reel flanges and thus out of engagement with the then threaded film.

The particular mode of securing the film end to the reel core has actually no influence upon the specific arrangement of the guide plate. Preferably, however, one will cover the reel core with an adhesive layer having sufficient adhesive force to engage the film end for winding, but insufficient to retain the film on the core when the film is being unwound later from the take-up reel. Another preferable way of engaging the film with the reel core is to provide a slot in the core. Prior to threading, the take-up reel is then turned so that the guide plate aims towards the core slot.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

Figure 1:
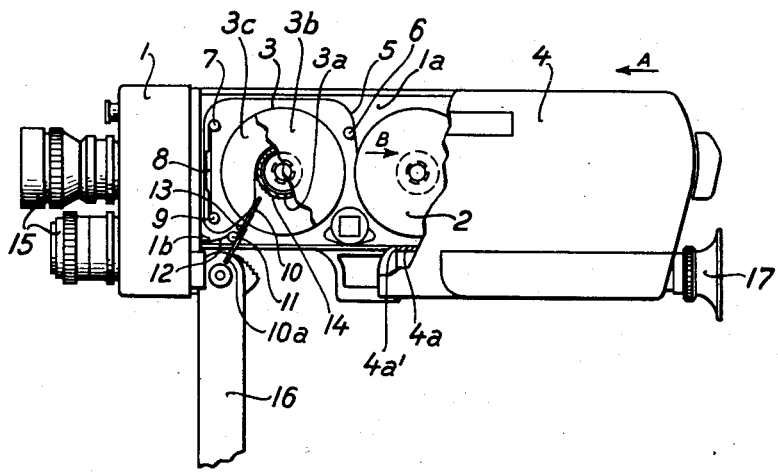
FIGURE 1 illustrates a side view of a movie camera with partially removed cover and partially cut-away take-up reel, and wherein an inventive example for film threading is shown with an adhesive layer on the core of the take-up reel.
Figure 2:
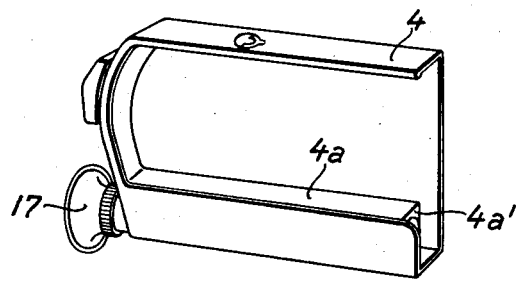
FIGURE 2 illustrates in perspective view the interior of the cover for the camera casing shown in FIGURE 1.

The movie camera illustrated in FIGURE 1 has a casing 1 to which are attached view finder and camera objectives 15 and a handle 16. There is a dividing wall 1a parallel to the plane of the drawing and separating the battery and motor chamber from the illustrated reel chamber. Inside of casing 1 there are provided a feed reel 2 and a take-up reel 3. Reel 3 has a core 3a, and flanges 3b and 3c. Flange 3b is visible when casing 1 is open. During operation, these two reels are laterally covered by a cover 4 which can be slipped onto the casing from the rear thereof and in the direction of arrow A. The cover is shown partially removed (direction of arrow B). When in closed position cover 4, of course, closes the camera casing light tight. The eye cup 17 is attached to cover 4. The film 5 runs from feed reel 2 via guide pulleys 6 and 7 to the camera window at a focal plane along a guiding plate 8, and from there via guide pulley 9 to take-up reel 3. The film is advanced at any suitable place between reels 2 and 3, which drive is not shown and conventional.

Figure 5:
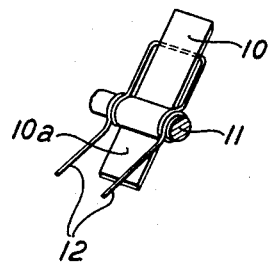
FIGURE 5 illustrates in perspective view the guide plate with spring usable in any of the devices illustrated in the aforementioned figures.
Figure 3:
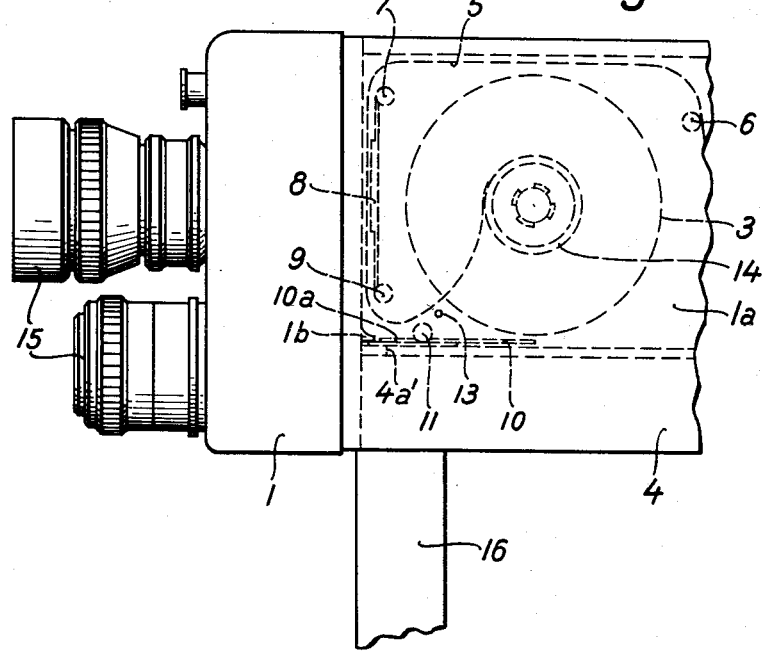
FIGURE 3 illustrates a side view of a portion of the camera shown in FIGURE 1 with the cover completely closing the camera casing but dashed lines show the inventive guide plate disengaged from the film.

A film guide plate 10 is pivotally mounted below take-up reel 3 as well as below the camera window at a stationary pivot screw 11. Pivot screw or pin 11 is secured to wall 1a. Guide plate 10 is spring biased by means of a spring 12 (see FIGURE 5) having two arms wound around screw 11 and having a crossbar urging plate in counterclockwise direction (FIGURE 1).

The guide plate 10 when in the illustrated position aims towards the core 3a of reel 3 but in a direction which is slightly eccentric with respect to the axis of rotation of reel 3. The arms of spring 12 engage a stationary lug 1b projecting from the front wall of casing 1 but still in the interior thereof. Lug 1b prevents that part of the spring 12 not engaging plate 10 from any pivot movement, particularly in clockwise direction. The plate 10 thus projects in-between the two lateral flanges 3a and 3b of take-up reel 3, but a stationary pin 13 restricts plate 10 from pivoting counterclockwise further than is shown in FIGURE 1. Hence, in the position shown the pin and spring arrangement 13–12 maintains plate 10 in a position enabling it to guide the film towards core 3a.

Guide plate 10 has a downwardly projecting arm 10a so that plate 10 with arm 10a actually constitutes a double arm lever. This arm 10a projects downwardly out of casing 1 whenever casing cover 4 is being removed. Arm 10a thus projects into the path of edge 4a' pertaining to a rib 4a of cover 4.

Upon closing the camera casing 1 by sliding cover 4 onto the casing 1 in direction of arrow A, the edge 4a' will engage arm 10a and pivot same clockwise. Due to the retention exerted by lug 1b upon the arms of spring 12, the tension of the spring is increased. Guide plate 10, of course, follows this pivot motion against the tension of spring 12 and thus guide plate 10 is pivoted out of the space between reel flanges 3a and 3b away from pin 13. Upon removal of cover 4, the tension of spring 12 urges again the plate towards abutment with pin 13.

The core 3a of reel 3 is covered with a self-adhering layer 14, for example, an adhesive on natural rubber basis or polyvinyl ether basis. The adhesive force of layer 14 when engaging the film end is sufficient to hold onto the film end after having been guided towards core 3a along plate 10 for threading. Also, the adhesive force is sufficient to take the film end along upon the first revolution of reel 3. The succeeding film layer reeled upon the first layer on core 3a, further strengthens adherance so that the film will then be reeled safely and wound upon reel 3.

Upon reversal of the film movement when for this purpose reel 3 becomes the feed reel, the last film layer will have to be forced off layer 14, however, the increased power requirement for removing the film end completely from layer 14 on core 3a is well within the force range available in conventional movie camera drives.

For operating the inventive device, the camera user slips off the cover 4 since he wants to reload the camera. The plate 10 thereby snaps upwardly and counter-clockwise into abutment with pin 13. After the user has placed a new feed reel 2 into its proper place, the film is advanced along pulleys 6, 7, plate 8 to pulley 9. Leaving pulley 9 the film end finds the upwardly directed plate 10 in its travel path and is thus guided to engage the adhesive layer 14 on core 3a of take-up reel 3 which thus commences to wind up the film. After the film has been advanced sufficiently to complete threading, cover 4 is slipped back (arrow A) onto casing 1 whereupon plate 10 is pivoted away from the film. The camera is then ready for use.

Figure 4:
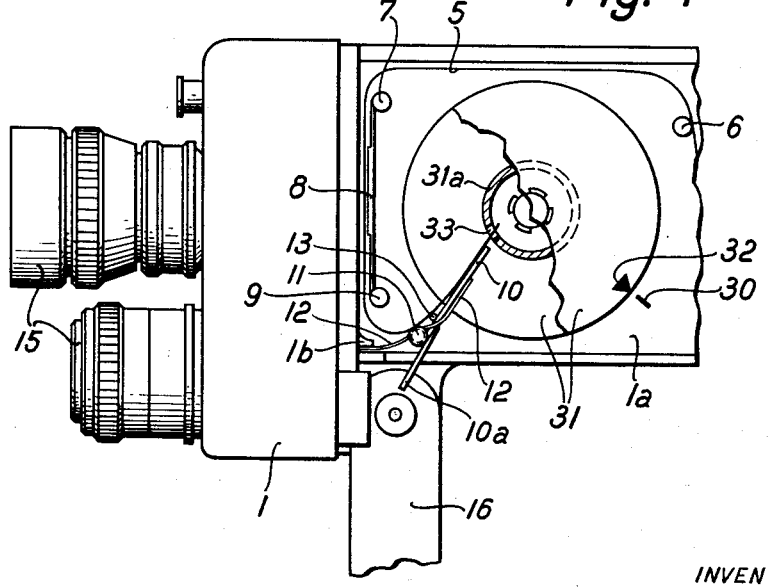
FIGURE 4 illustrates a similar camera casing and guide plate structure as compared with FIGURES 1 to 3, but the film is fastened to the take-up reel in a modified manner.

The modification illustrated in FIGURE 4 concerns only the take-up reel, here designated by reference numeral 31. Take-up reel 31 has a core 31a which is provided with a narrow axial slot of sufficient width to receive the film so that the film may enter the interior of core 33. For the threading of the film, reel 31 is manually turned until a marker 32 on the visible flange of reel 31 registers with a stationary index 30 on wall 1a. When reel 31 has assumed this position, the slot 33 in reel core 31a is in alignment with guide plate 10. The slot 33 itself is, of course, not visible when the reel 31 is being placed into the camera casing.

When new film is being advanced, the film end is guided upwardly along guide plate 10 as afore-described towards the core of the take-up reel, but now the film enters slot 33. This moment is illustrated in FIGURE 4. Reel 31 will be released manually and it starts to rotate winding film upon core 31a. One will preferably provide the axis parallel edges of slots 33 with teeth projecting into the interior of core 31a, so as to frictionally engage the film. Alternatively one can use resilient clamping means inside of core 31a engaging the film as soon as it passes through slot 33. These clamping means may comprise a crimped spring tape binder into which the film end slides but being retained securely therein.

The invention has been specifically described in connection with a film camera, since this is the preferred embodiment. However, the invention can readily be used in all types of apparatus wherein a film, tape or the like is to be threaded onto a normally covered take-up reel.

The invention is not limited to the embodiments described above but all changes and modifications thereof not constituting departures from the spirit and scope of the invention are intended to be covered by the following claims.

What is claimed is:

1. Automatic fastening device for films on a take-up reel in movie cameras or the like comprising: a take-up and a feed reel; a casing therefor; a cover for said casing; guide pulleys in said camera for guiding the film from said feed reel to said take-up reel; a guide plate in said casing; means mounting said guide plate for movement about a pivotal axis; spring biasing means in said casing for urging said guide plate about said pivotal axis into a position between the flanges of said take-up reel so that the film end when passing along said guide plate is guided towards the core of said take-up reel, whenever said cover is removed; means limiting movement of said guide plate about said pivotal axis; a lever arm rigidly connected to said guide plate and projecting from said pivotal axis and operating to rock said guide plate about said pivotal axis, said lever arm projecting from said casing when said cover is removed; and means on said cover engaging said lever arm when said cover is placed on said casing for pivoting said lever arm so that said guide plate disengages from the film and pivots out from between said reel flanges.

2. In a reeling device for tapes such as films the combination comprising: a casing; a cover for said casing having a path of movement into open and closed positions; a take-up reel having flanges and a core capable of engaging a tape end for fastening same onto said core; a guide plate in said casing; means pivotally mounting said guide plate; spring means urging said guide plate into a position between said flanges aiming towards said core for directing tape from said guide plate towards said reel core, when said cover is moved into open position; means limiting the position of said guide plate between said flange; and means operatively connected to said guide plate and projecting into said path of movement of said cover when said cover is in open position and pivoting said guide plate out of said position between said reel flanges when said cover is moved into closed position.

3. In a movie camera, the combination comprising: a casing; a cover for said casing having a path of movement into open and closed positions; a take-up reel having flanges and a core, there being a self-adhering layer on said core for engaging and adhering the film end to the core; a guide plate in said casing; means pivotally mounting said guide plate; spring means urging said guide plate into a position between said flanges aiming towards said core for directing film from said guide plate towards said reel core, when said cover is moved into open position; means limiting the position of said guide plate between said flange; and means operatively connected to said guide plate and projecting into said path of movement of said cover when said cover is in open position and pivoting said guide plate out of said position between said reel flanges when said cover is moved into closed position.

4. In a movie camera the combination comprising: a casing; a cover for said casing having a path of movement into open and closed positions; a take-up reel having flanges, there being a visible marker on one flange, said take-up reel further having a core with a slot capable of receiving a film end; a visible, stationary index in said casing; a guide plate in said casing; means pivotally mounting said guide plate; spring means urging said guide plate into a position between said flanges for aiming towards said core so as to direct film towards said slot, said guide plate when in said position, being aligned with said slot when said marker registers with said index; means limiting the position of said guide plate between said flanges; and means operatively connected to said guide plate and projecting into the path of movement of said cover when said cover is in open position and pivoting said guide plate out of said position between said reel flanges when said cover is moved into closed position.

References Cited by the Examiner

UNITED STATES PATENTS

| | | |
|---|---|---|
| 1,346,356 | 7/20 | Wenderhold. |
| 2,487,479 | 11/49 | Roehrl _____ 242—74.1 X |
| 2,578,283 | 12/51 | Bornemann et al. _____ 242—74 X |
| 2,891,736 | 6/59 | Blaes _____ 242—55.12 |

MERVIN STEIN, *Primary Examiner.*